United States Patent
Quirion et al.

(10) Patent No.: US 8,506,126 B2
(45) Date of Patent: Aug. 13, 2013

(54) RETROFIT LED LAMP ASSEMBLY FOR SEALED OPTICAL LAMPS

(75) Inventors: Steeve Quirion, Saint-Georges (CA); Robert Lachance, Saint-Georges (CA); Michel Bernard, Beauceville ouest (CA)

(73) Assignee: SQ Technologies Inc., Quebec (CA)

( * ) Notice: Subject to any disclaimer, the term of this patent is extended or adjusted under 35 U.S.C. 154(b) by 218 days.

(21) Appl. No.: 13/104,139

(22) Filed: May 10, 2011

(65) Prior Publication Data

US 2011/0279038 A1 Nov. 17, 2011

(30) Foreign Application Priority Data

May 12, 2010 (CA) ...................................... 2703611

(51) Int. Cl.
*F21V 19/02* (2006.01)
(52) U.S. Cl.
USPC ........................................ 362/289; 362/310
(58) Field of Classification Search
USPC .................. 362/285, 289, 297, 294, 373, 264, 362/310, 345–348, 249.02, 249.03, 249.07, 362/249.01
See application file for complete search history.

(56) References Cited

U.S. PATENT DOCUMENTS

| | | | | |
|---|---|---|---|---|
| 3,435,202 | A * | 3/1969 | Jablonski | 362/285 |
| 4,055,374 | A | 10/1977 | Barber, Jr. | |
| 4,142,179 | A * | 2/1979 | Lowndes | 340/321 |
| 4,507,717 | A * | 3/1985 | Wijbenga | 362/304 |
| 5,785,418 | A | 7/1998 | Hochstein | |
| 6,045,240 | A | 4/2000 | Hochstein | |
| 6,419,378 | B1 * | 7/2002 | Wedell et al. | 362/431 |
| 6,634,770 | B2 * | 10/2003 | Cao | 362/294 |
| 6,787,999 | B2 | 9/2004 | Stimac et al. | |
| 6,840,654 | B2 | 1/2005 | Guerrieri et al. | |
| 7,086,759 | B2 * | 8/2006 | Hartmann et al. | 362/311.02 |

(Continued)

FOREIGN PATENT DOCUMENTS

| | | |
|---|---|---|
| CA | 2703611 | 11/2011 |
| CN | 101122378 | 2/2008 |

(Continued)

OTHER PUBLICATIONS

Luo et al, Design and Optimization of Horizontally Located Plate Fin Heat Sink for High Power LED Street Lamps, IEEE Electronic Components and Technology Conference, 2009, pp. 854-859.

(Continued)

*Primary Examiner* — Julie Shallenberger
(74) *Attorney, Agent, or Firm* — Norton Rose Fulbright Canada LLP

(57) ABSTRACT

A retrofit LED lamp assembly for the replacement of light bulbs in optical lamps mounted elevated on support posts is described. The optical lamps have a lamp housing with a reflector secured therein and supporting a light bulb. A glass shade projects the light. The retrofit LED lamp assembly has a support member on which light emitting diodes (LED's) are electrically insulatingly supported to replace the light bulb. An adjustable connection assembly is provided to secure the support member to the reflector. The support member is configured to position the LED's at a predetermined angle and orientation relative to configured reflective surface segments of the reflector whereby to produce a desired oriented photometric light distribution pattern. A heat sink is securable in contact with the support member to dissipate heat. A clear tempered glass lens replaces the glass shade.

44 Claims, 4 Drawing Sheets

(56) References Cited

U.S. PATENT DOCUMENTS

| | | | |
|---|---|---|---|
| 7,314,291 B2 * | 1/2008 | Tain et al. | 362/294 |
| 7,344,279 B2 | 3/2008 | Mueller et al. | |
| 7,401,960 B2 | 7/2008 | Pond et al. | |
| 7,488,097 B2 | 2/2009 | Reisenauer et al. | |
| 7,507,001 B2 | 3/2009 | Kit | |
| 7,582,911 B2 | 9/2009 | Lynch et al. | |
| 7,625,104 B2 | 12/2009 | Zhang et al. | |
| 7,637,628 B2 | 12/2009 | Budike | |
| 2007/0041220 A1 | 2/2007 | Lynch | |
| 2008/0130288 A1 | 6/2008 | Catalano et al. | |
| 2008/0278955 A1 | 11/2008 | Boyer | |
| 2008/0285271 A1 | 11/2008 | Roberge et al. | |
| 2009/0046457 A1 | 2/2009 | Everhart | |
| 2009/0086488 A1 | 4/2009 | Lynch et al. | |
| 2009/0161359 A1 | 6/2009 | Siemiet et al. | |
| 2009/0213588 A1 | 8/2009 | Manes | |
| 2009/0267509 A1 | 10/2009 | Broitzman | |
| 2009/0290348 A1 | 11/2009 | Van Laanen et al. | |
| 2010/0014289 A1 | 1/2010 | Thomas et al. | |
| 2011/0013397 A1 | 1/2011 | Catone et al. | |
| 2011/0134239 A1 | 6/2011 | Vadai et al. | |

FOREIGN PATENT DOCUMENTS

| | | |
|---|---|---|
| CN | 201225571 | 4/2009 |
| CN | 201237114 | 5/2009 |
| GB | 840534 | 7/1960 |
| GB | 1004317 | 9/1965 |
| KR | 20090036783 | 4/2009 |
| WO | WO 2008/100124 | 8/2008 |
| WO | WO 2008/136652 | 11/2008 |
| WO | WO 2009/131372 | 4/2009 |

OTHER PUBLICATIONS

Luo et al, A Simplified Thermal Resistance Network Model for High Power LED Street Lamp, IEEE International Conference on Electronic Packaging Technology & High Density Packaging, 2008, pp. 1-7.

* cited by examiner

RETROFIT LED LAMP ASSEMBLY FOR SEALED OPTICAL LAMPS

TECHNICAL FIELD

The present invention relates to a retrofit LED lamp assembly for the replacement of light bulbs in sealed optical lamps and more specifically, but not exclusively, street lamps.

BACKGROUND ART

The use of LED's as a light source to provide indoor or outdoor illumination is known. Such LED's are usually mounted directly on a heat sink which is exposed to ambient air whereby to dissipate heat generated from the LED's. The life span of LED's depends on the effectiveness in the dissipation of the heat they generate. Usually, lamps constructed with LED's have an aluminum casing which forms the head of the lamp and LED's are integrated into the casing. When the LED's are defective or when its life span has expired, the complete head of the lamp needs to be replaced resulting in material waste and costly repairs. When LED's are used outdoors in a lighting fixture, their life span is quite short being exposed to the elements.

It is also known to replace standard light bulbs by LED lamps mounted with a screw base adapted to fit into the screw socket of the existing light bulb. Usually, such LED lamps do not effectively dissipate heat and again the LED's are directly exposed to the ambient air and are affected by rain, snow and the sun's rays. Reference is made to the following prior art patent documentation. U.S. Patent Application No. 2009/0267509 (Broitzman), Korean Patent Application No. 2009/0036783 (Yoo), Chinese Patent Application Nos. 201237114 (Hsu), 201225571 (Wenyan), 101122378 (Sun et al), as well as International PCT Application Nos. WO2009/131372 (Lee), WO2008/136652 (Vargas) and WO2008/100124 (Vargas).

It would be advantageous to change existing light bulbs used in sealed optical street lamps with LED lights whereby to extend the life cycle of the light source while at the same time resulting in a substantial energy saving. If the life cycle of the light source is extended, then the maintenance cost of the lamp is also greatly reduced. Known sealed optical street lamps, such as those known using Cobra heads typically use light bulbs having a durability of approximately 3,000 to 5,000 hours. They also consume about 132 watts. If such could be substituted by a suitable LED light source, the durability of such light source would increase to about 50,000 to 70,000 hours and the energy consumption would go down to about 35 watts. Accordingly, there would result an important saving in energy as well as in maintenance costs.

SUMMARY OF INVENTION

It is a feature of the present invention to provide a retrofit LED lamp assembly which substantially meets the above-desired need of existing sealed optical street lamps.

Another feature of the present invention is to provide a sealed optical street lamp which incorporates therein an LED lamp assembly for the replacement of the light bulbs.

Another feature of the present invention is to provide a sealed optical street lamp incorporating therein an LED light source assembly which can replace the existing light bulbs and their sockets and which provides for adjustability to produce a selected one of two or more photometric light distribution patterns.

Another feature of the present invention is to provide a sealed optical street lamp having an LED light source assembly fed by a encapsulated electronic power supply therefore further reducing the weight of the power supply mounted in such lamp heads and simultaneously provide more evacuated space for the dissipation of heat and providing for a lighter lamp head becoming less susceptible to oscillation during windy conditions.

Another feature of the present invention is to provide a sealed optical street lamp incorporating therein an LED light source having a finned heat sink to dissipate heat within the reflector and the head of the lamp by natural convection means.

Another feature of the present invention is to provide a sealed optical street lamp incorporating therein an LED light source assembly and which is easy to retrofit and which requires less maintenance than conventional sealed optical street lamps.

Another feature of the present invention is to provide a sealed optical street lamp incorporating therein an LED light source assembly and a flat lens of clear tempered glass and which achieves a desired illumination pattern which allows for increased illumination in a desired area by the elimination of wasted light energy.

Another feature of the present invention is to provide a sealed optical street lamp having an LED light source assembly and a driver circuit which is not affected by vibrations imparted to the housing such as during high wind conditions.

According to the above features, from a broad aspect, the present invention provides a retrofit LED lamp assembly for the replacement of light bulbs in optical lamps mounted elevated on support posts. The optical lamps having a lamp housing with a reflector secured therein and supporting a light bulb and a glass shade for the projection of light. The retrofit LED lamp assembly is comprised of a support member on which light emitting diodes (LED's) are electrically insulatingly supported to replace the light bulb. Connection means is provided to secure the support member to the reflector. The support member is configured to position the LED's at a predetermined angle and orientation relative to configured reflective surface segments of the reflector whereby to produce a desired oriented photometric light distribution pattern. A heat sink is securable in contact with the support member to dissipate heat.

According to a further broad aspect of the present invention the connection means is an adjustable connection means to position the LED's at a selected one of two or more predetermined positions relative to the reflective surface segments of the reflector to produce a selected one of two or more photometric light distribution patterns.

According to a further broad aspect of the present invention there is provided a sealed optical street lamp having a lamp housing fitted with a lens. A reflector is supported in the housing. An LED light source assembly is mounted in the reflector and adjacent the lens. The LED light source assembly has a support member on which light emitting diodes (LED's) are electrically insulatingly supported. Connection means is provided to secure the support member to the reflector. The support member is configured to position the LED's at a predetermined angle and orientation relative to configured reflective surface segments of the reflector whereby to produce a desired oriented photometric light distribution pattern. Heat dissipation means is provided in contact with the support member and adapted to dissipate heat to the reflector and the lamp housing to provide an efficient temperature environment for the LED's.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
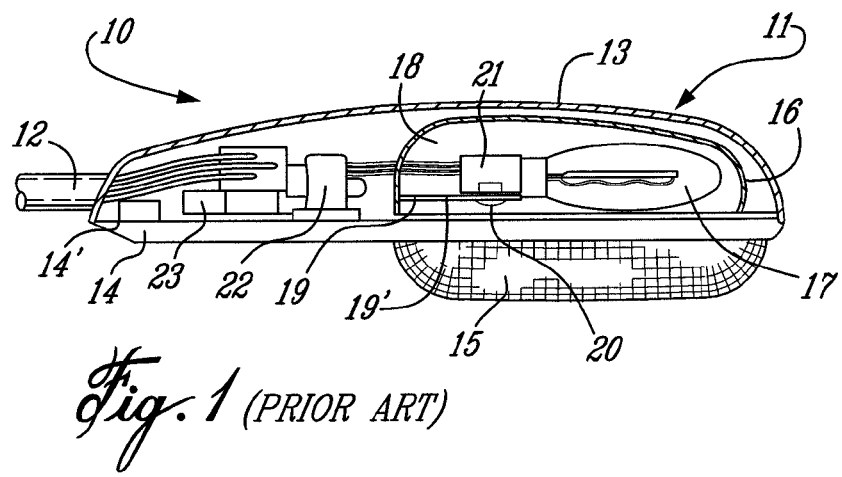
FIG. 1 is a partly fragmented view of a sealed optical street lamp constructed in accordance with the prior art.

Referring now to the drawings and more particularly to FIG. 1, there is shown generally at 10 a sealed optical street lamp housing constructed in accordance with the prior art. The sealed optical street lamp as hereinshown has a well known Cobra head 11, manufactured by General Electric Co., which is secured to a support bridge arm 12 adapted to be secured to a pole whereby to support the head elevated above a ground surface. Typically these heads are supported a distance of 20 to 30 feet above the ground, depending on their use. The head 11 is comprised of an upper casing section 13 casted of aluminum and a hinged lower casing section 14, also casted of aluminum. A prismatic glass diffuser 15 is secured to the lower casing. The lower casing section 14 is supported on a hinge 14' and provides access to the inside of the upper casing section 13.

Inside the upper casing section 13 is removably mounted a light reflector 16. A light bulb 17 is secured in spaced-apart relationship with respect to the reflective inner surface 18 of the reflector and is displaceable on an adjustable support bracket 19. This bracket has a slot 19' and a securing screw 20 to adjust the lamp on its longitudinal axis at a desired location whereby the lamp can produce two or more desired oriented photometric light distribution patterns.

The light bulb 17 is secured in a screw socket 21 which is connected to a power supply transformer 22. A ballast 23 is also provided as well as light sensors and switches and connectors as is conventional with these seal optical street lamps.

Figure 2:
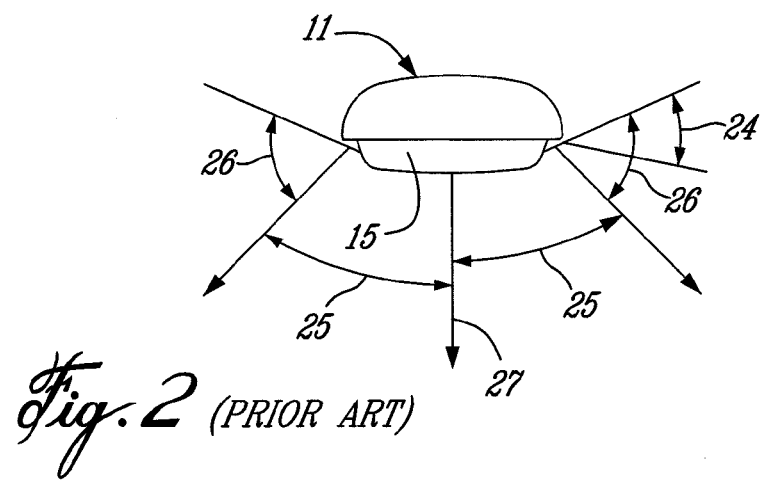
FIG. 2 is a schematic view of a prior art sealed optical street lamp illustrating the illumination pattern thereof and a desired illumination pattern.

As shown in FIG. 2, such sealed optical street lamps 10 produce illumination patterns wherein approximately 30 percent of the output light in the area identified by arrow 24 is wasted and in fact is a nuisance as it illuminates the sky and objects in the vicinity of the street lamp and it produces a glare which is distractive to automobile conductors. It is desired to produce an illumination pattern which is more efficient and which allows increased illumination or a lower powered light source and this is achieved with the present invention wherein the photometric light distribution pattern is better oriented as shown by arrows 25 and results in a reduction of wasted light energy by approximately 40 percent as indicated by arrows 26. Ideally, the photometric light distribution pattern or lobe extends to an angle of approximately 62° to 65° from the vertical axis 27 and as indicated by arrow 25.

Figure 3:
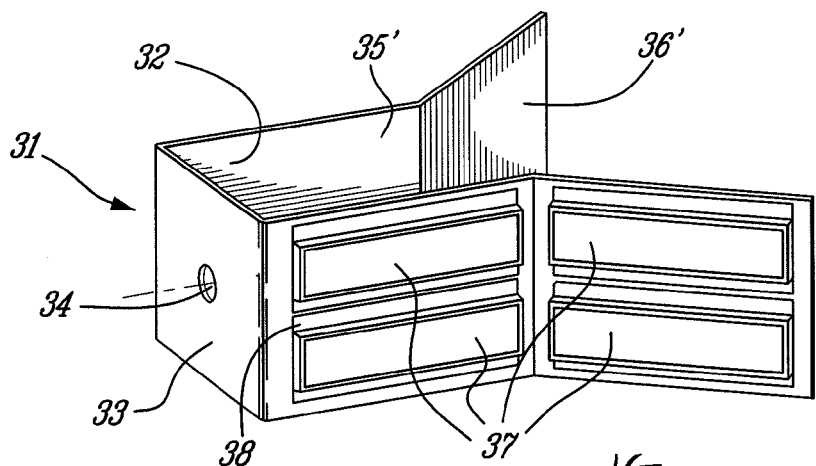
FIG. 3 is a perspective view showing the construction of the support member of the LED light source assembly.
Figure 4:
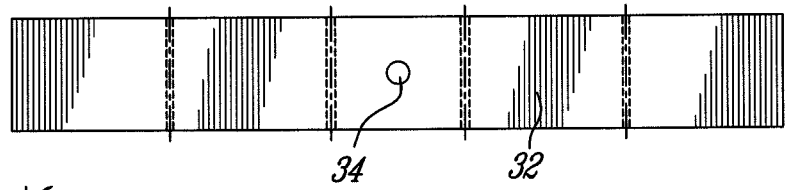
FIG. 4 is a plan view of a metal strip utilized to construct the support member of FIG. 3.
Figure 5:
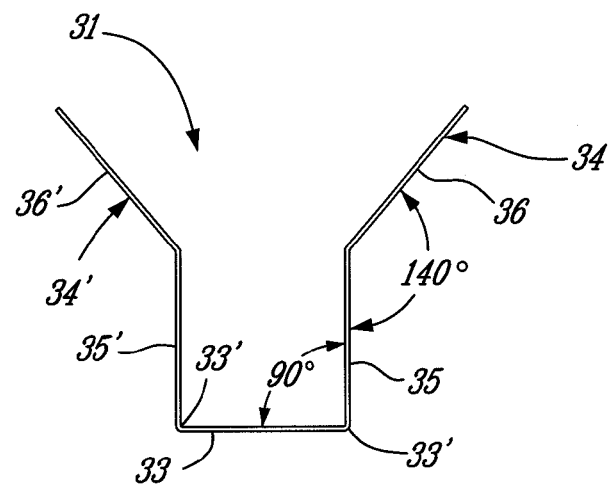
FIG. 5 is a top view of FIG. 3.
Figure 6:
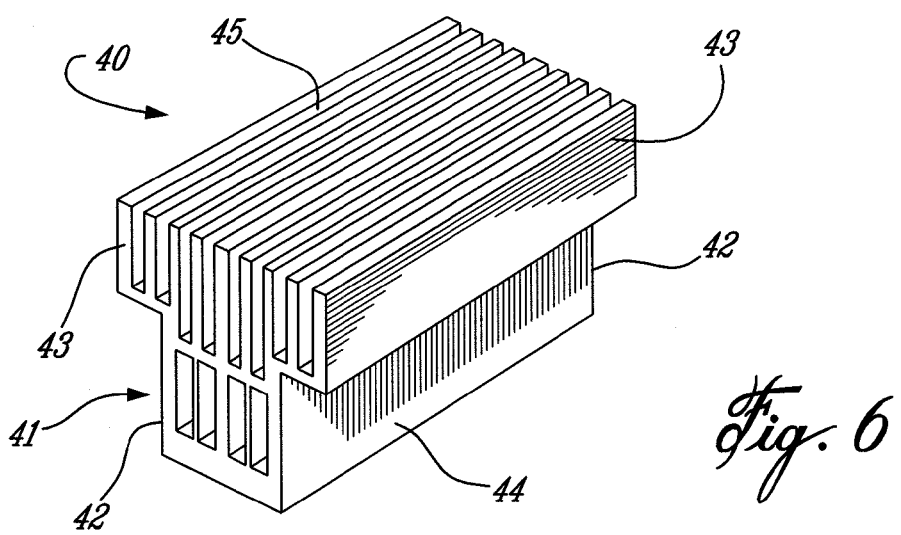
FIG. 6 is a perspective view of the finned heat sink constructed for attachment in contact with the support member of FIG. 3.

With reference now to FIGS. 3 to 5, there will be described the construction of the LED light source assembly of the present invention. This LED light source assembly is identified by reference numeral 30 in FIG. 8. As shown in FIGS. 3 to 5, this assembly 30 includes a support member 31 which is formed by a flat heat conductive rectangular aluminum plate 32 which is bent in the shape of a Y as shown in FIG. 5 to define a connecting end wall 33 provided with a hole 34 at the center thereof. A pair of symmetrical branch sections 34 and 34' extend from opposed vertical edges 33' of the connecting end wall 33 and define straight inner sections 35 and 35' extending transverse to the flat connecting end wall 33, and straight outwardly flared outer wings or sections 36 and 36', respectively. Elongated rectangular shaped flat polymer light emitting diodes 37, herein triphosphorous photoelectric LED's, are secured to an electrically insulating backing substrate 38 formed of epoxy or other suitable material and secured to the flat outer surfaces of the straight inner sections 35 and 35' and branch sections 34 and 34'. The orientation or angular position of the branch sections are dictated by the reflective inner surface configuration of the reflector 16. Heat generated by the light emitting diodes 37 is conducted immediately into the aluminum plate 32. To dissipate this heat from the support member 31 and the LED's 37, there is provided a finned heat sink 40 constructed as shown in FIG. 6. The shape of the inner and outer branch sections and their angular disposition will depend on the distribution pattern of the lumens on the ground to be lit and, of course, the reflecting formations of the reflector to which the LED light source assembly is to be mounted.

The LED's are selected to generate a predetermined approximate lumens value when the LED's attain a stable condition after being switched ON. When LED's are switched ON, the junction temperature increases gradually and simultaneously its generated lumens decrease until the LED reaches a stable junction temperature. The effective lumens of the diode also depend on the characteristics of the heat sink and all associated heat transfer components, such as the reflective finish on the reflector and the coefficient of light transmission of the glass lens, as these components absorb a certain quantity of lumens. The efficiency of the luminaire needs to take into account all of these lumen losses and also the distribution of the lumens on the ground to be illuminated, such as road, houses, etc. For example, for the construction of a 60 watt luminaire having LED's capable of generating 6000 lumens, the LED's need to generate a minimum of 100 lumens per watt. In the embodiment described, the Cobra head is supportive at about 30 feet above ground and taking into account all lumen losses such a luminaire would transmit about 4400 lumens on the illuminated ground pattern.

With the design of the support of the embodiment described herein, the distribution of the lumens on the ground will depend on the size and angles of the support on which the diodes are secured and the characteristics of the reflector. The correct size and angle of the sections 35 and of the support member 31 is very important. The rectangular LED's for the luminaire herein described require LED's having a maximum length of 75 mm and maximum width of 25 mm to conform with the length and angles of the optimized support member 31. The rectangular shape of the LED's is important to achieve a good distribution pattern of the lumens on the ground by the Cobra reflector herein illustrated.

Figure 7:
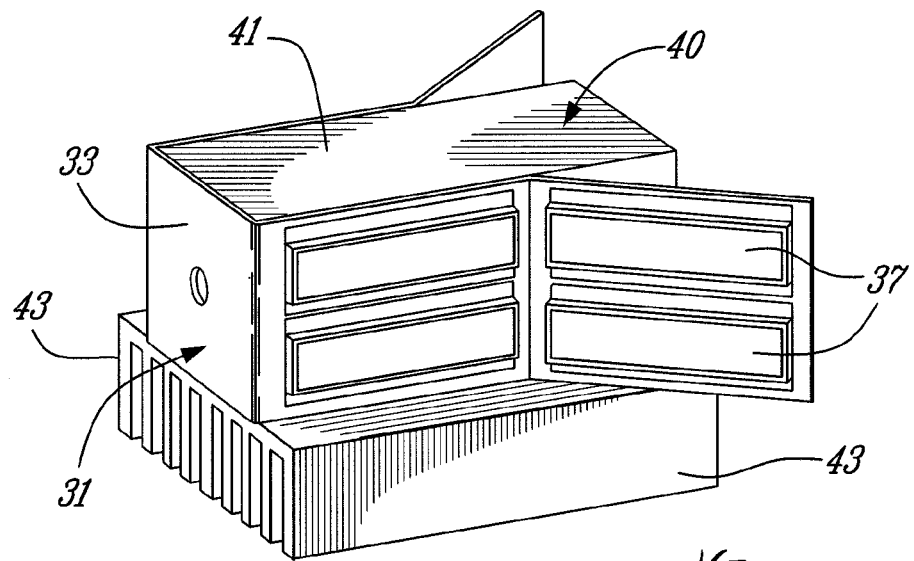
FIG. 7 is a perspective view showing the finned heat sink secured to the support member.
Figure 8:
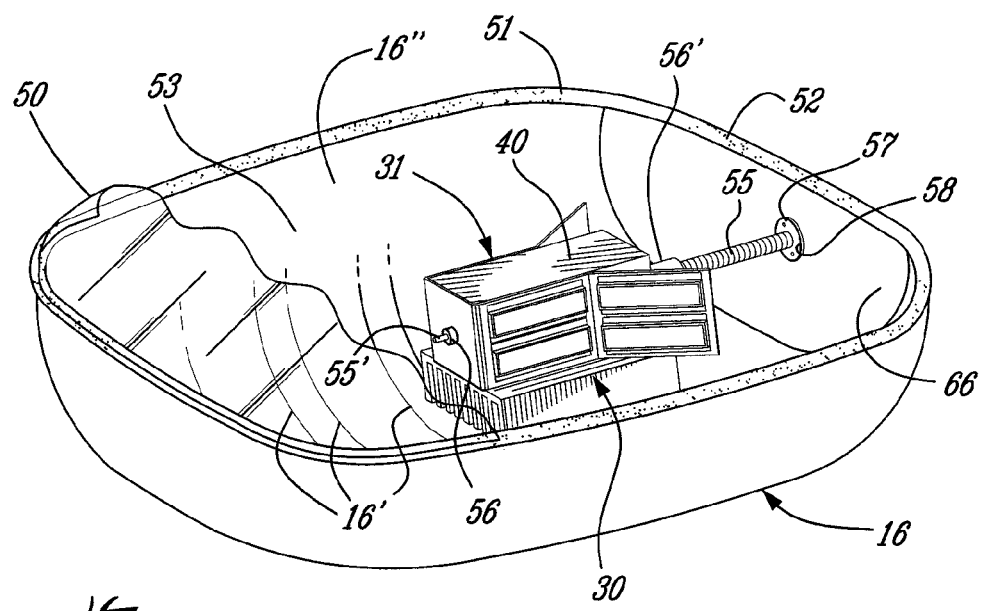
FIG. 8 is a perspective view illustrating the retrofit LED light source assembly of the present invention secured inside the reflector of a sealed optical street lamp and with a tempered glass lens secured over the reflector.

The finned heat sink 40, as shown in FIG. 6, was specifically designed for the support member 31, as shown in FIGS. 3 and 5. It is also conceivable that the planar surface of the branch sections could be angulated, again depending on the shape of the reflecting formations of the reflector. As hereinshown, these planar surfaces are oriented transverse to a planar surface of the lens 50, as shown in FIG. 8, which is secured in flush contact about the peripheral outer edge 51 of the reflector 16 and over a felt gasket 52. With the design of the support member 31 the branch outer section 36 extends an angle of 140° from the straight inner section 35. The finned heat sink 40 is adapted for close fit contact within the U-shaped section defined between the connecting end wall 33 and the straight inner sections 35 and 35' whereby to evacuate heat from the aluminum support 31. FIG. 7 shows the disposition of the heat sink when connected to the support member.

As shown in FIGS. 6 and 7, the finned heat sink 40 has a rectangular heat spreading core section 41 defining opposed heat conducting flat walls 42 adapted for flush engagement with the inner surface of the straight inner wall sections 35 and 35' of the support member. The finned heat sink 40 further defines wing sections 43 extending outwardly of the core section 41 and laterally of the opposed heat conducting side walls 42 whereby to provide a larger heat dissipating section. A hollow tubular formation 44 is formed in a central fin 45 to receive therein a support rod as will be described later. As shown in FIG. 7, the finned heat sink has a plurality of fins or walls extending parallel to one another between the opposed heat conducting flat walls 42 and also extending between the wing sections 43. The finned heat sink dissipates heat from the support member 31 in the enclosed, substantially sealed, space defined between the clear tempered glass lens 50 and the reflective inner surface of the reflector 16, as shown in FIG. 8. Of course, the lens 50 is secured to the hinged lower casing 14 but shown here when in position with the casing section 14. Because the reflector is secured in contact with the upper casing section 13 of the lamp head 11, heat is transferred directly into the upper casing section and evacuated to outside ambient air by normal convection. Also, as will be described later, the transformer and ballast and other components which are housed within the upper casing section 13 of the head is replaced by an electronic power supply, which does not generate heat, and liberates space to evacuate heat to the inside of the lamp head. Accordingly, heat generated by the LED's is more efficiently evacuated from the sealed reflector.

Figure 10:
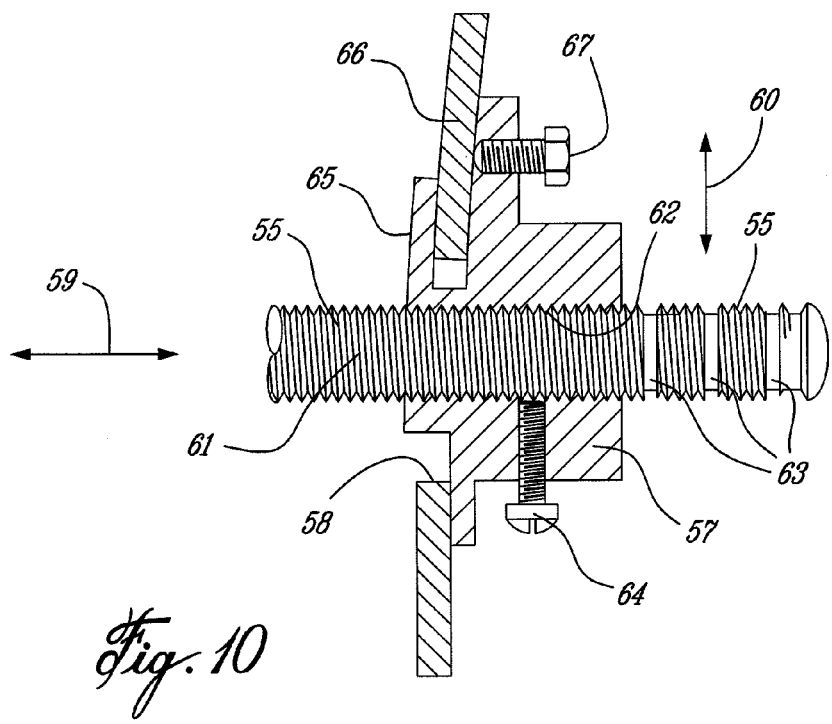
FIG. 10 is a fragmented view showing the construction of the reflector connector and its adjustment and the adjustable support rod of the support member.

Referring now to FIGS. 8 and 10, there is shown the manner in which the support member and its LED's and incorporated heat sink are secured to the reflector 16. As hereinshown, a connection means, in the form of an adjustable connection means, is comprised of a threaded support rod 55 which is secured at one end to the support end wall 33, herein the far end 55' which extends through the hole 34 of the connecting end wall 33 by a lock nut 56. Another lock nut 56' is secured on the backside of the heat sink 40. The support rod 55 extends through the hollow tube formation 44 as shown in FIG. 6. At the opposed end 55" of the support rod 55 and as shown in FIG. 10, the rod is secured in a reflector connector 57 which is secured to the reflector 36 in a hole 58 which existed to secure the adjustable bracket 19 which has now been removed from the reflector with the removal of the light bulb 17 and its screw socket 21. This hole was also necessary to pass the wiring to the light bulb. Accordingly, this hole now serves to secure the retrofit LED lamp assembly.

Figure 9:
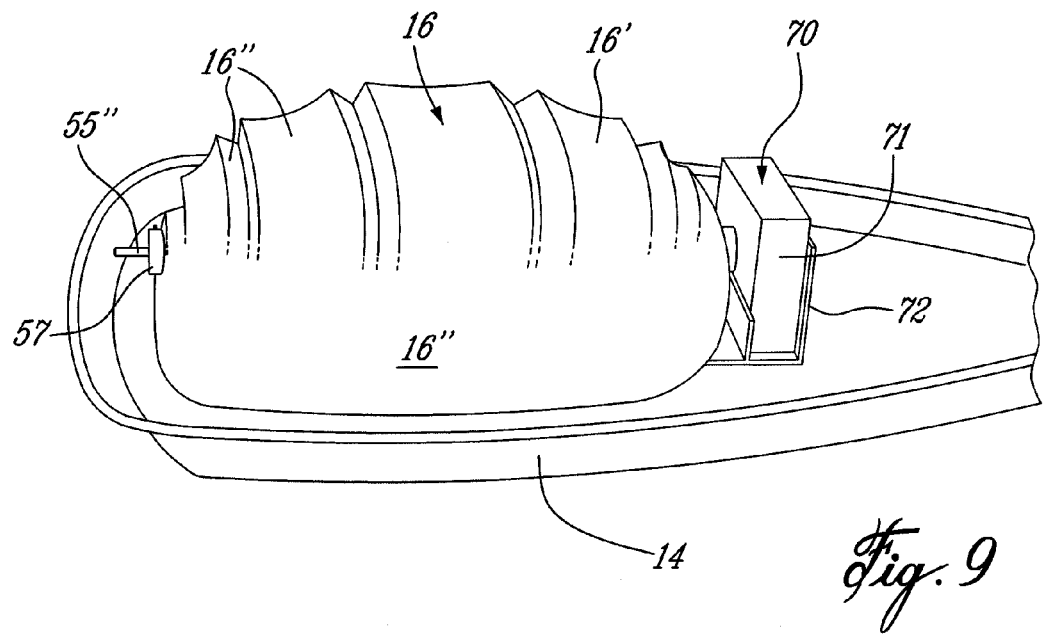
FIG. 9 is a rear view of the reflector showing the position of the encapsulated electronic power supply and the reflector connector of the LED light source assembly.

The support rod 55 is adjustable axially in the reflector connector 57 as indicated by arrow 59 in FIG. 10. It is also adjustable vertically as indicated by arrow 60 whereby to position the LED's at two or more predetermined positions relative to the reflective surface segments such as segments 16' and 16" as shown in FIGS. 8 and 9 of the reflector. As shown in FIGS. 8 and 10, the support rod 55 has a threaded portion 61 which extends through the reflector connector 57. This threaded portion 61 extends into a threaded bore 62 formed in the reflector connector. Indicia means in the form of markings 63 are formed in the end section 55" of the support rod 55 and they provide for specific adjustments in the distance between the reflector connector 57 and the support member 31 whereby the LED's may be positioned at a predetermined location relative to the reflective surface segments of the reflector. Accordingly, when the LED light source assembly is assembled, the reflector connector 57 is secured at a precise distance from the support member 31 whereby to produce a desired oriented photometric light distribution pattern. This pattern can be varied by displacing the support rod 55 longitudinally and securing same in position by the lock screw 64 whereby to illuminate one or two lanes of a road thereadjacent.

The reflector connector 57 is also adjustable vertically as indicated by arrow 60 and this is achieved by the slotted wing formation 65 formed with the reflector connector engaging the reflector side wall 66 adjacent the hole 58 formed in the side wall 66. A set screw 67 immovably secures the reflector connector 57 to the side wall 66 at the proper vertical position. Of course, the reflector connector and the adjustable connection of the support rod 55 therewith as well as its securement in the hole 58 formed in the side wall 66 of the reflector can be constituted by different designs obvious to a person skilled in the art, as long as it provides for axial adjustment of the support rod as well as vertical adjustment thereof through the reflector connector. The indicia means 63 may also be provided by stamp markings or colored bands painted on the end section 55" of the support rod. The location of the support 30 can also be adjusted by the use of a measuring instrument or a jig.

As shown in FIG. 9 and as previously described, another feature of the present invention is to replace the power supply shown in FIG. 1, namely the transformer, its ballast and some other associated components, by an electronic driver circuit 70, to provide the current to operate the LED's. The driver circuit construction is not shown herein but it is an electronic AC/DC converter which is encapsulated in an epoxy material to form a driver module 71. As hereinshown a bracket 72 is secured behind the reflector 16 whereby the driver module 71 can be attached thereto. As can be seen, this driver module is very small and compact and liberates much of the space within the lamp head 11 behind the reflector. Being an electronic driver, negligible heat is produced by this driver module. The driver greatly reduces the weight of a power supply as well as liberating space in the lamp housing. Because there is less weight in the head of the lamp, there is less vibration due to wind load. Also, this liberated space makes it easier to install the retrofit assembly.

A heat sensor may be mounted at a convenient location on the reflector to sense the temperature inside the reflector to feed temperature signals to a controller associated with the driver module 71 to control the current being supplied by the intelligent driver circuit whereby not to damage the LED's and to achieve its expected life cycle.

It is within the ambit of the present invention to cover any obvious modifications of a preferred embodiment described herein provided such modifications fall within the scope of the appended claims.

We claim:

1. A sealed optical street lamp having a lamp housing fitted with a lens, a reflector supported in said housing, said reflector having configured reflective surface segments, an LED light source assembly mounted in said reflector and adjacent said lens, said LED light source assembly having a thermally conductive support member on which light emitting diodes (LED's) are electrically insulatingly supported, adjustable connection means to secure said support member to said reflector and position said support member and said LED's at a selected one of two or more predetermined positions relative to said reflective surface segments of said reflector, said adjustable connection means being a support rod secured at one end to said support member and at an opposed end to a reflector connector secured to said reflector, and means to adjust the axial displacement of said support rod exteriorly of said reflection, said support rod having at least an adjustably engageable portion extending through said reflector connector and a lock member to arrest the position if said adjustably engageable portion relative to said reflector connector, said support member being configured to position said LED's at a predetermined angle and orientation relative to said configured reflective surface segments of said reflector whereby to produce a desired oriented photometric light distribution pattern, and heat dissipation means in contact with said support member and adapted to dissipate heat from said support member to said reflector and said lamp housing to provide an efficient temperature environment for said LED's.

2. A sealed optical street lamp as claimed in claim 1 wherein said lock member is a lock screw extending into said reflector connector transverse to said support rod for arresting engagement therewith, said reflector connector having vertical adjustment means.

3. A sealed optical street lamp as claimed in claim 1 wherein indicia means is associated with said threaded portion indicating said two or more predetermined positions.

4. A sealed optical street lamp as claimed in claim 1 wherein said support member is formed by a flat heat conductive metal plate shaped to define a connecting end to which is secured said adjustable connection means and a pair of symmetrical branch sections to which said LED's are electrically insulatingly mounted, each branch section being shaped to position said LED's at said predetermined angle and orientation.

5. A sealed optical street lamp as claimed in claim 4 wherein said branch section of said metal plate has a planar surface thereof oriented transverse to a planar surface of said lens.

6. A sealed optical street lamp as claimed in claim 4 wherein said LED's are elongated rectangular shaped flat polymer light emitting diodes.

7. A sealed optical street lamp as claimed in claim 6 wherein said branch sections each comprise a straight inner section extending transverse to a flat connecting end wall section constituting said connecting end and a straight outwardly flared outer section, said diodes being secured to each said straight inner and straight outer sections.

8. A sealed optical street lamp as claimed in claim 7 wherein said connecting wall section and said inner and outer sections are integrally formed by said flat heat conductive metal plate, said straight inner section of said pair of symmetrical branch sections extending parallel to one another.

9. A sealed optical street lamp as claimed in claim 8 wherein said straight outwardly flared outer sections extend outwardly at an angle of 140° from its associated straight inner section.

10. A sealed optical street lamp as claimed in claim 1 wherein said heat dissipation means is comprised of a finned heat sink secured in direct contact with said support member.

11. A sealed optical street lamp as claimed in claim 10 wherein said support member is formed by a flat heat conductive metal plate shaped to define a flat connecting end wall section and opposed spaced-apart flat branch sections, each branch section having a straight inner section extending transverse to said end wall section and a straight outwardly flared outer section, said finned heat sink having a rectangular heat spreading core section having opposed heat conductive flat walls, said core section being secured between said straight inner sections of said spaced-apart branch sections with said opposed heat conductive flat wall in flush contact with an inner surface of a respective one of said straight inner sections, said finned heat sink having wing sections extending outwardly of said core section and laterally of said opposed heat conductive side walls.

12. A sealed optical street lamp as claimed in claim 11 wherein said spaced-apart fin walls extend parallel to one another between said opposed heat conductive flat walls and extend between said wing sections, said reflector being a formed metal sheet reflector having an inner reflective surface, said finned heat sink dissipating heat from said support member in an enclosed space defined between said lens and said reflector for absorption of dissipated heat by said reflector.

13. A sealed optical street lamp as claimed in claim 12 wherein said reflector is secured in heat transfer contact with said lamp housing for natural convection of heat transferred into said lamp housing.

14. A sealed optical street lamp as claimed in claim 4 wherein said LED's are secured to said branch sections by an adhesive layer which is a thermally conductive epoxy or a thermally bonding compound defining an electrically insulating layer, said support member being formed of aluminum.

15. A sealed optical street lamp as claimed in claim 1 wherein there is further provided a driver circuit to provide a current supply for operating said LED's, said driver circuit having an electronic AC/DC converter, said driver circuit being encapsulated in an epoxy material to form a driver module.

16. A sealed optical street lamp as claimed in claim 15 wherein said driver module is removably secured to a clamp secured to said reflector and positioned in said housing.

17. A sealed optical street lamp as claimed in claim 1 wherein said lens is a clear tempered glass lens, said lens being held in position between a head section of said housing and a lower hinged lens retaining section and a felt gasket about a peripheral edge of said head section for receiving a contour edge portion of said lens in clamping engagement therewith by said lens retaining section.

18. A retrofit LED lamp assembly for the replacement of light bulbs in optical lamps mounted elevated on support posts, said optical lamps having a lamp housing with a reflector secured therein and supporting a light bulb and a glass shade for the projection of light, said retrofit LED lamp assembly comprising a support member on which light emitting diodes (LED's) are electrically insulatingly supported to replace said light bulb, connection means to secure said support member to said reflector, said support member being configured to position said LED's at a predetermined angle and orientation relative to configured reflective surface segments of said reflector whereby to produce a desired oriented photometric light distribution pattern and a heat sink securable in contact with said support member to dissipate heat said connection means being a reflector connector adapted for mounting in an opening of the reflector created after the removal of a lamp socket connector of said lamp, said connection means being an adjustable connection means having an adjustable support rod adjustably connected to said reflector connector, said adjustable support rod has an engageable portion extending through said reflector connector and a threaded lock member to arrest the position of said threaded portion relative to said reflector connector.

19. A retrofit LED lamp assembly as claimed in claim 18 wherein there is further provided an electronic driver circuit to replace an AC power supply including a transformer mounted in said optical lamp housings.

20. A retrofit LED lamp assembly as claimed in claim 19 wherein said electronic driver circuit is encapsulated in an epoxy material to form a driver module, and a bracket to secure said driver module.

21. A retrofit LED lamp assembly as claimed in claim 18 wherein indicia means is associated with said threaded portion indicating two or more predetermined support rod positions whereby to locate said LED's at a selected one of two or more predetermined positions relative to a reflective surface of said reflector to produce a selected one of two or more photometric light distribution patterns.

22. A retrofit LED lamp assembly as claimed in claim 18 wherein said support member is formed by a flat heat conductive metal plate shaped to define a connecting end to which is secured said adjustable connection means and a pair of symmetrical branch sections to which said LED's are electrically insulatingly mounted, each branch section being shaped to position said LED's at said predetermined angle and orientation.

23. A retrofit LED lamp assembly as claimed in claim 22 wherein said branch section of said metal plate has a planar surface thereof oriented transverse to a planar surface of said lens.

24. A retrofit LED lamp assembly as claimed in claim 22 wherein said LED's are elongated rectangular shaped flat polymer diodes.

25. A retrofit LED lamp assembly as claimed in claim 24 wherein said branch sections each comprise a straight inner section extending transverse to a flat connecting end wall section constituting said connecting end and a straight outwardly flared outer section, said diodes being secured to each said straight inner and straight outer sections.

26. A retrofit LED lamp assembly as claimed in claim 25 wherein said connecting wall section and said inner and outer sections and integrally formed by said flat heat conductive metal plate, said straight inner section of said pair of symmetrical branch sections extending parallel to one another.

27. A retrofit LED lamp assembly as claimed in claim 18 wherein said heat sink is a finned heat sink, said support member being formed by a flat heat conductive metal plate shaped to define a flat connecting end wall section and opposed spaced-apart flat branch sections, each branch section having a straight inner section extending transverse to said end wall section and a straight outwardly flared outer section, said finned heat sink having a rectangular heat spreading core section having opposed heat conductive flat walls, said core sections being secured between said straight inner sections of said spaced-apart branch sections with said opposed heat conductive flat wall in flush contact with an inner surface of a respective one of said straight inner sections, said finned heat sink having wing sections extending outwardly of said core section and laterally of said opposed heat conductive side walls.

28. A retrofit LED lamp assembly as claimed in claim 27 wherein said spaced-apart fin walls extend parallel to one another between said opposed heat conductive flat walls and extend between said wing sections, said reflector being a formed metal sheet reflector having an inner reflective surface, said finned heat sink dissipating heat from said support member in an enclosed space defined between said lens and said reflector for absorption by said reflector.

29. A sealed optical street lamp having a lamp housing fitted with a lens, a reflector supported in said housing, said reflector having configured reflective surface segments, an LED light source assembly mounted in said reflector and adjacent said lens, said LED light source assembly having a thermally conductive support member on which light emitting diodes (LED's) are electrically insulatingly supported, connection means to secure said support member to said reflector, said support member being configured to position said LED's at a predetermined angle and orientation relative to said configured reflective surface segments of said reflector whereby to produce a desired oriented photometric light distribution pattern, and heat dissipation means in contact with said support member and adapted to dissipate heat from said support member to said reflector and said lamp housing to provide an efficient temperature environment for said LED's, said heat dissipation means being comprised of a finned heat sink secured in direct contact with said support member, said support member being formed by a flat heat conductive metal plate shaped to define a flat connecting end wall section and opposed spaced-apart flat branch sections, each branch section having a straight inner section extending transverse to said end wall section and a straight outwardly flared outer section, said finned heat sink having a rectangular heat spreading core section having opposed heat conductive flat walls, said core section being secured between said straight inner sections of said spaced-apart branch sections with said opposed heat conductive flat wall in flush contact with an inner surface of a respective one of said straight inner sections, said finned heat sink having wing sections extending outwardly of said core section and laterally of said opposed heat conductive side walls.

30. A sealed optical street lamp as claimed in claim 29 wherein said spaced-apart fin walls extend parallel to one another between said opposed heat conductive flat walls and extend between said wing sections, said reflector being a formed metal sheet reflector having an inner reflective surface, said finned heat sink dissipating heat from said support member in an enclosed space defined between said lens and said reflector for absorption of dissipated heat by said reflector.

31. A sealed optical street lamp as claimed in claim 30 wherein said reflector is secured in heat transfer contact with said lamp housing for natural convection of heat transferred into said lamp housing.

32. A sealed optical street lamp having a lamp housing fitted with a lens, a reflector supported in said housing, said reflector having configured reflective surface segments, an LED light source assembly mounted in said reflector and adjacent said lens, said LED light source assembly having a thermally conductive support member on which light emitting diodes (LED's) are electrically insulatingly supported, connection means to secure said support member to said reflector, said support member being configured to position said LED's at a predetermined angle and orientation relative to said configured reflective surface segments of said reflector whereby to produce a desired oriented photometric light distribution pattern, and heat dissipation means in contact with said support member and adapted to dissipate heat from said support member to said reflector and said lamp housing to provide an efficient temperature environment for said LED's, and wherein there is further provided a driver circuit to provide a current supply for operating said LED's, said driver circuit having an electronic AC/DC converter, said driver circuit being encapsulated in an epoxy material to form a driver module, said driver module being removably secured to a clamp secured to said reflector and positioned in said housing.

33. A retrofit LED lamp assembly for the replacement of light bulbs in optical lamps mounted elevated on support posts, said optical lamps having a lamp housing with a reflector secured therein and supporting a light bulb and a glass shade for the projection of light, said retrofit LED lamp assembly comprising a support member on which light emitting diodes (LED's) are electrically insulatingly supported to replace said light bulb, connection means to secure said support member to said reflector, said support member being configured to position said LED's at a predetermined angle and orientation relative to configured reflective surface segments of said reflector whereby to produce a desired oriented photometric light distribution pattern and a heat sink securable in contact with said support member to dissipate heat, said heat sink being a finned heat sink, said support member being formed by a flat heat conductive metal plate shaped to define a flat connecting end wall section and opposed spaced-apart flat branch sections, each branch section having a straight inner section extending transverse to said end wall section and a straight outwardly flared outer section, said finned heat sink having a rectangular heat spreading core section having opposed heat conductive flat walls, said core sections being secured between said straight inner sections of said spaced-apart branch sections with said opposed heat conductive flat wall in flush contact with an inner surface of a respective one of said straight inner sections, said finned heat sink having wing sections extending outwardly of said core section and laterally of said opposed heat conductive side walls.

34. A retrofit LED lamp assembly as claimed in claim 33 wherein there is further provided an electronic driver circuit to replace an AC power supply including a transformer mounted in said optical lamp housings.

35. A retrofit LED lamp assembly as claimed in claim 34 wherein said electronic driver circuit is encapsulated in an epoxy material to form a driver module, and a bracket to secure said driver module.

36. A retrofit LED lamp assembly as claimed in claim 33 wherein said connection means is a reflector connector adapted for mounting in an opening of the reflector created after the removal of a lamp socket connector of said lamp, said connection means being an adjustable connection means having an adjustable support rod adjustably connected to said reflector connector.

37. A retrofit LED lamp assembly as claimed in claim 36 wherein said adjustable support rod has a threaded rod portion extending through said reflector connector and a threaded lock member to arrest the position of said threaded portion relative to said reflector connector.

38. A retrofit LED lamp assembly as claimed in claim 37 wherein indicia means is associated with said threaded portion indicating two or more predetermined support rod positions whereby to locate said LED's at a selected one of two or more predetermined positions relative to a reflective surface of said reflector to produce a selected one of two or more photometric light distribution patterns.

39. A retrofit LED lamp assembly as claimed in claim 36 wherein said support member is formed by a flat heat conductive metal plate shaped to define a connecting end to which is secured said adjustable connection means and a pair of symmetrical branch sections to which said LED's are electrically insulatingly mounted, each branch section being shaped to position said LED's at said predetermined angle and orientation.

40. A retrofit LED lamp assembly as claimed in claim 39 wherein said branch section of said metal plate has a planar surface thereof oriented transverse to a planar surface of said lens.

41. A retrofit LED lamp assembly as claimed in claim 39 wherein said LED's are elongated rectangular shaped flat polymer diodes.

42. A retrofit LED lamp assembly as claimed in claim 41 wherein said branch sections each comprise a straight inner section extending transverse to a flat connecting end wall section constituting said connecting end and a straight outwardly flared outer section, said diodes being secured to each said straight inner and straight outer sections.

43. A retrofit LED lamp assembly as claimed in claim 42 wherein said connecting wall section and said inner and outer sections and integrally formed by said flat heat conductive metal plate, said straight inner section of said pair of symmetrical branch sections extending parallel to one another.

44. A retrofit LED lamp assembly as claimed in claim 33 wherein said spaced-apart fin walls extend parallel to one another between said opposed heat conductive flat walls and extend between said wing sections, said reflector being a formed metal sheet reflector having an inner reflective surface, said finned heat sink dissipating heat from said support member in an enclosed space defined between said lens and said reflector for absorption by said reflector.

* * * * *